ard portion of the automobile and has
UNITED STATES PATENT OFFICE.

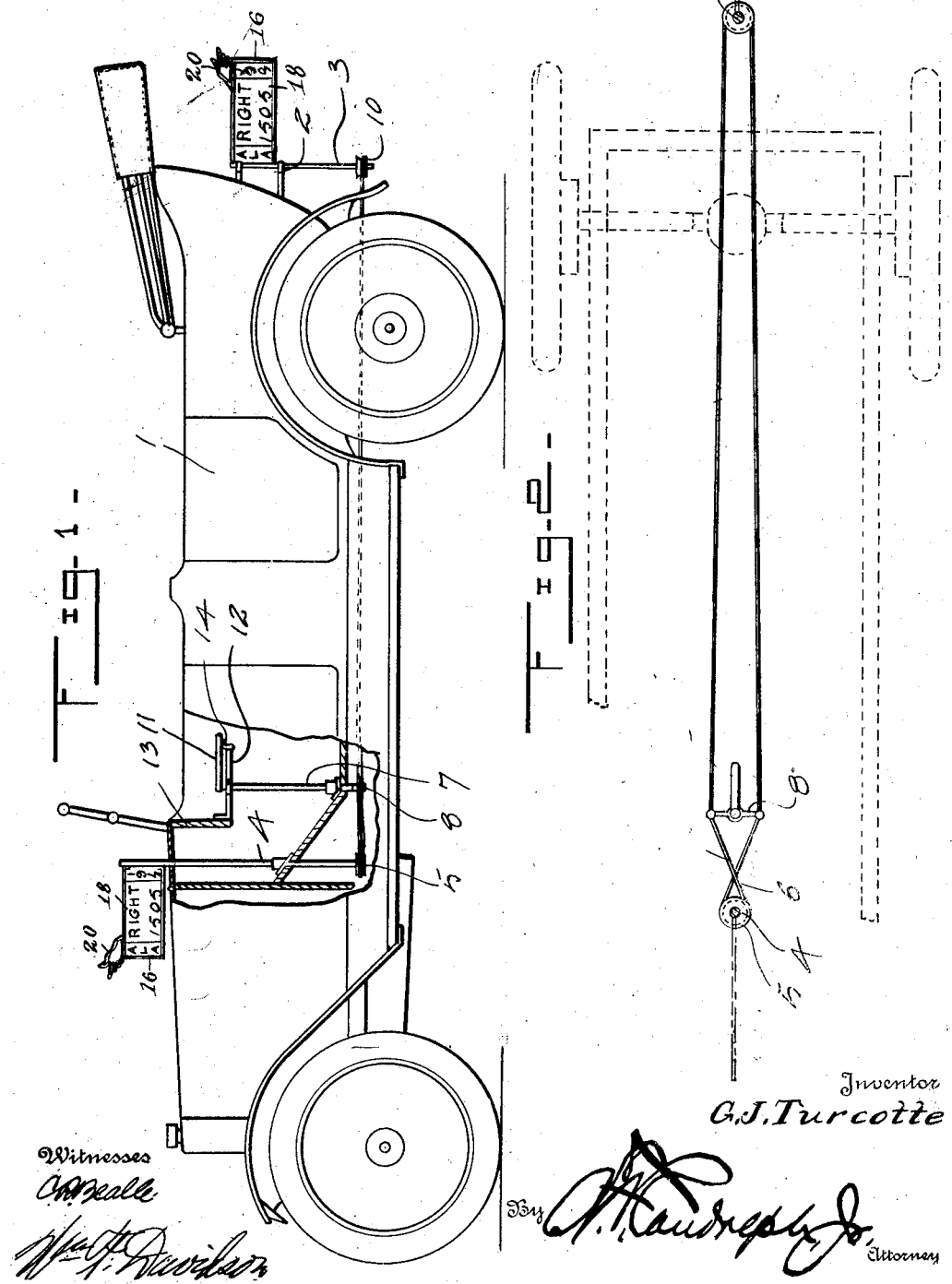

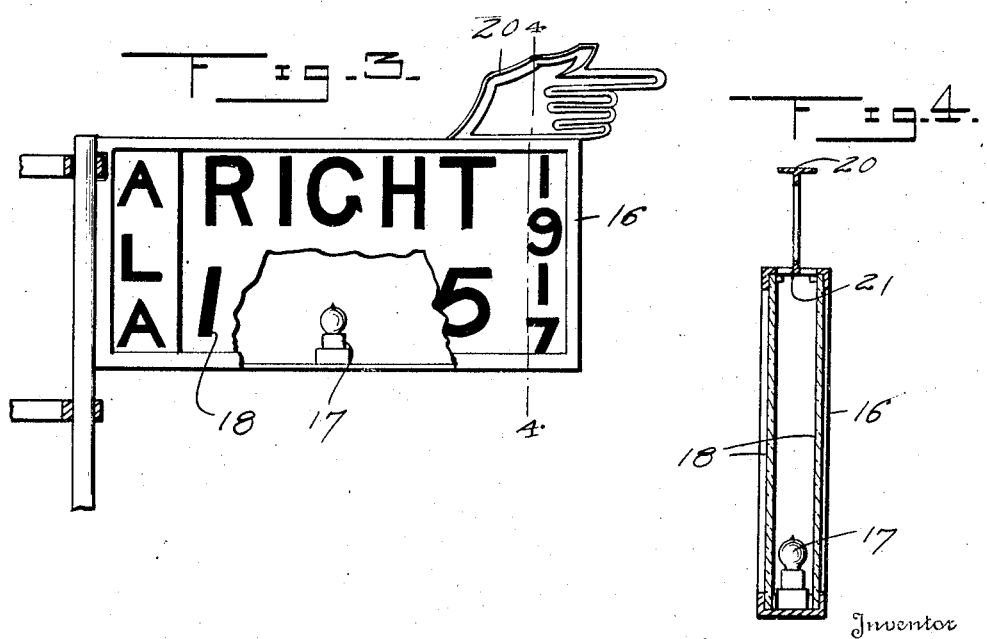

GEORGE J. TURCOTTE, OF MOUNT VERNON, ALABAMA.

AUTOMOBILE DIRECTION-INDICATOR.

1,355,717. Specification of Letters Patent. Patented Oct. 12, 1920.

Application filed May 22, 1917. Serial No. 170,218.

*To all whom it may concern:*

Be it known that I, GEORGE JOSEPH TURCOTTE, a citizen of the United States, residing at Mount Vernon, in the county of Mobile and State of Alabama, have invented certain new and useful Improvements in Automobile Direction-Indicators; and I do hereby declare the following to be a full, clear, and exact description of the invention, such as will enable others skilled in the art to which it appertains to make and use the same.

This invention relates to an automobile direction indicator and has for one of its objects the provision of a device of this character, whereby the operator of the automobile may readily notify the traffic in front and in rear in which direction a turn is contemplated prior to making the same.

A still further object of this invention is the provision of an automobile direction indicator of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation of an automobile illustrating a direction indicator applied thereto constructed in accordance with my invention, Fig. 2 is a top plan view of the direction indicator applied to a fragmentary portion of the chassis of an automobile, Fig. 3 is a side elevation of one of the signals, Fig. 4 is a transverse sectional view taken on the line 4—4 of Fig. 3.

Referring in detail to the drawings, the numeral 1 indicates an automobile of an ordinary type and to which my invention is applied.

A pair of relatively spaced brackets 2 are secured to the rear of the automobile in which is journaled a vertical rod 3.

A vertical rod 4 is journaled in the forward portion of the automobile and has mounted upon its lower end, a pulley 5 over which travels a flexible element 6, such as a chain or the like. An operating rod 7 is journaled to the automobile adjacent the operator's seat thereof, and has secured to its lower end, a pair of oppositely disposed arms 8, to which the flexible element 6 is connected. The flexible element 6 is intercrossed between the arms and the pulley 5 as illustrated at 9. After the flexible element 6 has been connected to the oppositely disposed arms 8, it passes rearwardly under the automobile and about a pulley 10 secured to the lower end of the vertical shaft 3. Secured to the upper end of the operating rod 7 is a handle 11 for the purpose of turning the rod in either direction to rotate the vertical rods 3 and 4 in either direction. A quadrant 12 is secured to the dash 13 of the automobile and is adapted to be engaged by a spring catch 14 upon the handle 11 for locking said handle in various positions upon the quadrant.

Elongated casings 16 are secured to the upper ends of the vertical rods 3 and 4 and are constructed to receive glass plates 18, on which may be coated or otherwise applied, certain direction indicating characters, such as "Right," "Left," State and year.

Located within the frames 16 are electric lamps 17. The electric lamp 17 located in the rear signal or frame 16 is preferably coated or colored red, while the electric lamp within the front signal or casing is preferably coated green so as to distinguish the front and rear signals from each other.

Formed upon the upper longitudinal edges of the frames 16 are hollow indicating hands 20, which are adapted to receive light from the electric lamps 17 through an opening 21 in the frames 16. The indicating hands 20 may be perforated or they may be constructed in skeleton formation so as to make the hands visible at night time.

In operation, by operating the handle 11 in either direction, the frames 16 will be swung in a similar direction indicating in which direction the automobile is going to turn. The electric lamps may be illuminated in any desired manner such as connecting the same to an ignition or lighting system of the automobile.

While I have shown and described the preferred embodiment of my invention, it will be understood that minor changes in construction, combination and arrangement of parts may be made without departing from the spirit and scope of the invention as claimed.

Having thus described my invention, what I claim is:

An automobile signal comprising a frame having spaced slots in its top wall adjacent one corner, signaling panels closing the frame, illuminating means in said frame, and a skeleton indicator formed on said corner of the frame between said slots to be illuminated by said means.

In testimony whereof I affix my signature in presence of two witnesses.

GEORGE J. TURCOTTE.

Witnesses:
OCTAVE A. ALVAREZ,
ALFRED G. WARD.